Sept. 22, 1964    H. R. MULDER    3,149,449
WINDROWING ATTACHMENT FOR STRAW CHOPPER
Filed March 28, 1962

INVENTOR
HARCO R. MULDER
BY
Williamson & Palmatier
ATTORNEYS

United States Patent Office 3,149,449
Patented Sept. 22, 1964

3,149,449
WINDROWING ATTACHMENT FOR
STRAW CHOPPER
Harco R. Mulder, Altamont, S. Dak.
Filed Mar. 28, 1962, Ser. No. 183,114
4 Claims. (Cl. 56—192)

This invention relates to material diverting devices and in particular to a windrowing attachment for the straw chopper of a combine.

Grain harvesting combines are frequently provided with a straw chopper which chops up or cuts heavy grain or flex straw, soy beans stalks, weeds and the like. The chopper cuts the straw into short lengths and normally distributes the cut straw in an even thin layer over substantially the entire width of the combine swath so that the straw may be subsequently plowed back into the soil. Often times, however, some types of straw are picked up and collected for such uses as bedding or feed for livestock and flax straw is sold for making paper.

Therefore, the primary object of this invention is to provide an attachment for the aforementioned straw chopper which is capable of windrowing the material discharged from the chopper to facilitate subsequent pick up and collection thereof.

Another object is to provide a windrowing attachment of the type described which is capable of selectively positioning the windrows to the right or left side of the combine as desired.

Still another object is to provide a windrowing attachment of the type described which is capable of delivering the straw in a steady stream with sufficient force so that the straw can be delivered successfully into and against a fairly heavy side wind.

Still another object is to provide a windrowing attachment of the type described which is capable of distributing substantially all of the straw coming from the chopper in a windrow on one side or the other of the combine with little or no loss due to straw dropping on the ground directly behind the chopper.

Another object is to provide a windrowing attachment of the type described which is simple and inexpensive to make, is easy to operate and which can be readily attached to straw choppers already on the market.

A more specific object is to provide a windrowing attachment of the type described which utilizes means for intercepting the material issuing from the chopper and diverting the direction thereof for discharge in a steady stream to one side of the combine and chopper to form a windrow in combination with protective guide means which shield the straw from the wind as it travels from the chopper to the diverting means and guides the straw thereagainst to thereby prevent scattering and loss of straw and insure that the straw will be discharged from the diverting means with maximum force.

These and other objects and advantages of this invention will more fully be described from the following description made in connection with the accompanying drawings wherein like reference characters refer to the same or similar parts throughout the description, and wherein.

Figure 1:
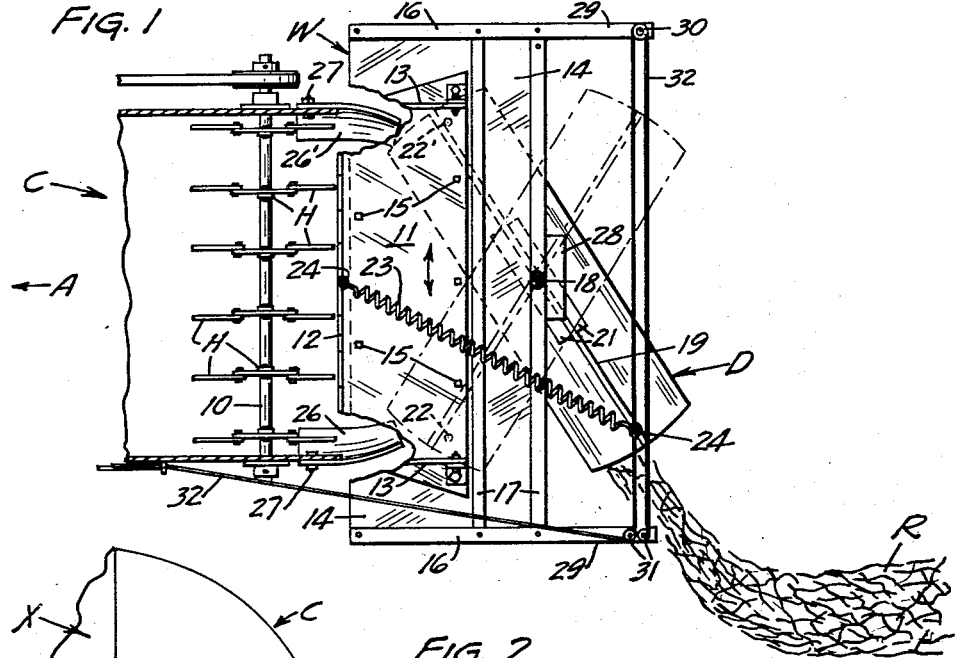
FIG. 1 is a top plan view of one preferred embodiment of the windrowing attachment of this invention attached to the straw chopper of a combine, with portions thereof broken away for ease of illustration.
Figure 2:
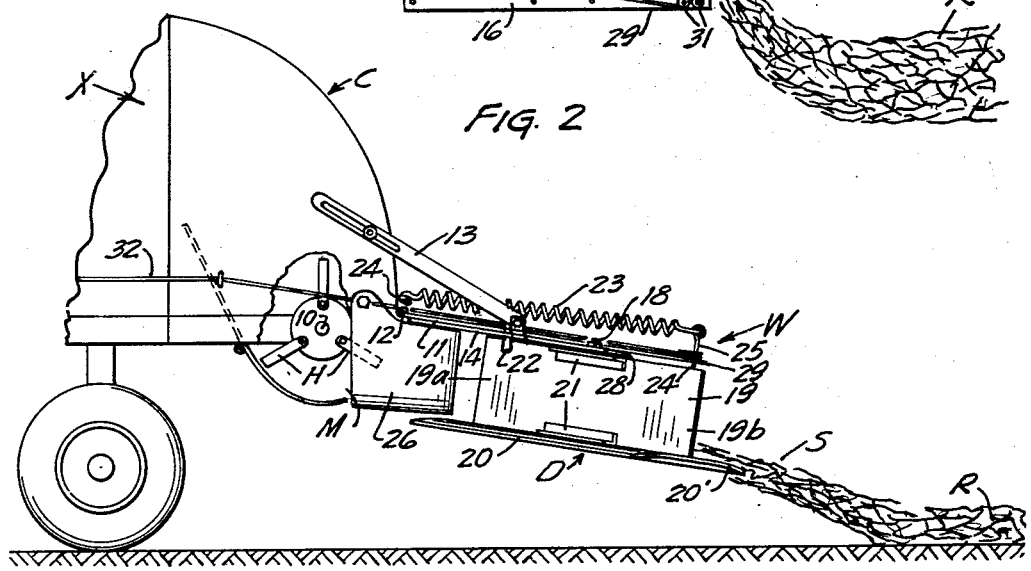
FIG. 2 is a side elevational view of FIG. 1 with portions broken away.
Figure 3:
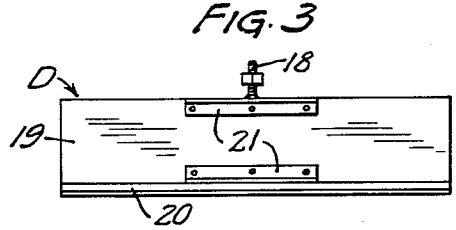
FIG. 3 is a detail view of the diverter in side elevation.
Figure 4:
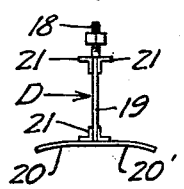
FIG. 4 is an end view of the diverter of FIG. 3.
Figure 5:
FIG. 5 is a detail view of the side shields showing them in perspective.

Reference is now made to the accompanying drawings for a more detailed description of this invention.

The windrowing attachment of this invention is indicated generally by the reference letter W and is shown mounted on the rear or discharge side of a conventional straw chopper C which in turn is mounted upon the rear of a combine X which normally travels in the direction shown by arrow A. The chopper shown includes the hammers H which are mounted on the rotatable chopper shaft 10 which hammers, chops and cuts the straw fed to it from the combine and discharges the straw rearwardly from its discharge opening or mouth M to the windrowing attachment of this invention.

The windrowing attachment has diverter supporting and material confining top structure which includes a rearwardly extending supporting plate 11 which is hingedly connected to the chopper C for vertical swinging movement by means of the hinges 12. A pair of elongate adjustable side braces 13 are provided which extend between and are connected to the plate 11 and the chopper C in order to hold the plate 11 and the additional structure carried thereby at any desired height above the ground. This ability to vary the height of the windrowing attachment through the hinge connection between the windrowing attachment and the chopper permits adjustment or control of the placing of the windrow at varying distances to either side of the combine.

The plate 11 has another material confining top plate 14 attached to the underside thereof by any suitable means such as bolts 15, the plate 14 extending rearwardly from immediately adjacent the chopper beyond the outer edge of plate 11, the underside of said plate 14 preferably providing a smooth planar surface to permit free flow of the chopped straw therepast and to permit free movement of the diverter to be described hereinafter in close relationship thereto. The plate 14 may be reinforced, if necessary, by longitudinally extending members 16 and transversely disposed members 17 mounted on the top side of the plate 14.

A diverter member indicated generally by D is pivotally suspended from the outer edge portion of the plate 14 by means of a pivot bolt 18 which permits free pivotal movement of the diverter about a generally vertical axis whereby the diverter can be swung from side to side and selectively positioned for delivery and windrowing of the straw to the right or left side of the combine as desired. The diverter shown is of generally inverted T-shape as viewed in cross section and includes an elongate vertically disposed straight material diverting or deflector plate 19 and a pair of generally horizontally disposed material carrying and supporting flanges 20 and 20' which extend laterally from each side of the diverter plate, which flanges serve to carry and support the stream of chopped straw as it is thrown rearwardly by the chopper and diverted to one side or the other by the diverter plate 19. The central portion of the diverter plate 19 may be reinforced with members 21 to make it more rigid if necessary.

A pair of stop pins 22 and 22' are provided which extend downwardly from the plate 14, one on each side thereof, said stop pins being so disposed as to be engaged by the inner end portion of the diverter plate 19 so as to hold the diverter in left hand or right hand delivery position as desired.

An over-center spring 23 is provided which shifts from one side to the other of the pivot bolt as the diverter is turned and biases the diverter towards right or left hand position, depending on which side of the pivot bolt it is located and holds the diverter against the stop pins in the position desired, one end of the spring being anchored to the chopper as at 24, the other end of the spring being anchored to a rod 25 which is connected to and extends upwardly from the outer end portion of the diverter plate 19.

To protect the straw from the wind and guide it to and against the diverter plate, a pair of adjustable side shields or guide members 26 and 26' are provided, which are bolted to the sides of the chopper as at 27 on each side of the discharge mouth thereof so as to extend rearwardly therefrom and enclose the discharge area immediately adjacent the discharge mouth of the chopper. The bolts 27 provide a pivot connection between the shields and the chopper whereby the bolts may be loosened to permit the shields to be raised or lowered when the plate 11 is raised or lowered in order to maintain the proper relationship between the shields and the remainder of the attachment. The top edges of these shields are preferably maintained in abutting or close contiguous relationship with the plate 14. These shields are preferably bent inwardly so as to narrow the stream of straw coming from the chopper and guide it inside and against the diverter and prevent lateral escape of the material before reaching the diverter. These shields are also preferably curved or convexed outwardly when viewed in cross-section, with the front lower end portion 26a' thereof bent inwardly to aid in funneling the material to the diverter.

The diverter is preferably so designed that the upper edge of the inner end 19a of the diverter plate 19 freely slides against plate 14 or is in contiguous relationship therewith in order to prevent the escape of material therebetween and to prevent the chopper material from collecting at or lodging against the pivot bolt. 18. To aid in maintaining this relationship between the diverter plate and the plate 14, an extension 28 is provided which constitutes an extension of the plate 14 so that the upper edge of the outer portion 19b of the diverter plate 19 located outwardly of the pivot bolt 18 engages this extension and thereby prevents downward tilting or dipping of the inner end portion of the diverter, with dipping of either end of the diverter being prevented by engagement thereof with the plate 14 and its extension on opposite sides of the pivot bolt.

The diverter may be manually operated to change positions, or suitable remote control means may be provided. One form of remote control means for operating the diverter are shown in the accompanying drawings and includes a pair of elongate pulley supporting members 29 which are mounted on the plate 14, one of said members having a pulley 30 mounted thereon, the other member having a double pulley 31 mounted thereon. A single continuous operating rope 32 is trained about the pulleys as shown with a portion thereof anchored to the spring anchoring rod 25, with the two free ends of the rope extending forwardly to the operating cab. Thus, a pull on one end of the rope causes the diverter to swing into one position and a pull on the other end of the rope causes the diverter to swing over to the other position.

The diverter plate 19 is preferably straight as shown from end to end thereof to provide minimum resistance to the flow of material being diverted thereby, thereby enabling the chopper straw to be discharged from the outer end thereof with maximum force possible. It is also desirable to have the diverter located as close to the chopper as possible consistent with free swinging movement of the inner end of the diverter relative to the chopper from one side to the other in order to utilize as much as possible the propulsion force effected by the hammer mill of the straw chopper and in order to have the chopped straw thrown against the diverter with as much force as possible. The closeness of the diverter to the chopper also insures that substantially all of the material will reach the diverter and will not fall short unto the ground directly behind the chopper. It will also be noted that the inner end of the diverter plate 19 is located slightly outside the outer end of the shields 26 and 26' in order to insure that all of the material is thrown against the diverter and thereby prevent escape of material from between the shields and the inner end of the diverter plate. The stop pins 22 and 22' are so arranged as to normally hold the diverter at about a 45 degree angle from the direction of travel, but this angle may vary within reasonable limits as desired. The carrying flanges 20 and 20' are wide enough to insure adequate carrying support for the material as it is being diverted and windrowed and prevents it being spilled and scattered upon the ground immediately behind the chopper.

In use and operation, the angular disposition and elevation of the attachment above the ground is adjusted as desired by swinging the entire attachment up or down on the hinges 12 in order to control the distance of the windrow from the combine. The diverter is then positioned for delivery to the left side (as shown by the solid line position of FIG. 1) or for delivery to the right side (as shown by the broken line position of FIG. 1), the over-center spring 23 and the stop pins 22-22' cooperating to hold the diverter in either of these positions.

As the chopper straw is thrown rearwardly from the straw chopper by the hammer mill, it passes within and between the confines of the top plate 14 and the side shields 26-26' to and against the diverter plate 19 which diverts the material right or left according to the position of the diverter. The top plate 14 and side shields 26-26' confine and enclose the material as it emerges from the chopper and guide the material to the diverter, preventing upward and lateral escape of the material before it reaches the diverter. The side shields also narrow the flow of material thrown against the diverter, and protect the material from any side winds which would otherwise interfere with the flow of material to the diverter. The material is merged by the diverter into a narrower stream S which is carried and supported by one of the carrying flanges 20 or 20' to prevent falling thereof until after the stream of material has left the outer end of the diverter, the stream of chopped straw falling in a windrow R behind and to the side of the combine as it moves forwardly.

The diverter may be left in one position if the field is worked by going back and forth from one side thereof or the diverter may change position after each complete turn around the field where the field is worked by cutting completely around the entire periphery thereof and then progressively working inwardly towards the center in a concentric path of travel.

Regardless of which way the field is worked, the diverter of this invention makes it possible to lay two windrows close enough together so that one pass along the two with a side delivery rake will make them into one good windrow. By so doing, the traveling distance of the baler can be cut in half. As a result, the baler is given a capacity load at a lower traveling speed resulting in considerable saving in fuel, labor and wear on equipment. The diverter of this invention enables all of the straw to be laid in these adjacent windrows to facilitate the raking and picking up thereof and prevents straw from being scattered and lost.

It should also be noted that in many of the choppers now on the market concave teeth are provided which contribute to the chopping action on the straw. In some instances it may be desirable to remove these concave teeth from the chopper when using our diverter to prevent excessive chopping of the straw since excessive chopping may interfere with the use for which the straw is to be put after picking up same.

From the foregoing, the advantages of the windrowing attachment of this invention are readily apparent. The attachment is relatively inexpensive and easy to make, and can be readily attached to or mounted on any straw chopper including those presently on the market. The attachment enables the material to be windrowed to the right or left of the combine as desired and prevents spilling of the material on the ground directly behind the chopper. Furthermore, the attachment is so designed as to deliver the stream of material with the maximum force possible and with sufficient force to enable the material to be delivered against a fairly strong side wind. The side shields provide protection against these side winds and limit the disturbance of the material by said side winds as the material is being delivered from the chopper to the diverter prior to its being formed into the laterally directed narrow windrowing stream.

It will, of course, be understood that various changes may be made in the form, details, arrangement and proportions of the various parts without departing from the scope of my invention.

What I claim is:

1. A windrowing attachment for a straw chopper having a discharge mouth comprising supporting structure adapted for mounting on said chopper including generally horizontally disposed top enclosure means for overlying the flow of material issuing from said chopper, material deflection means suspended from said supporting structure for pivotal movement about a generally vertical axis between first and second operating positions, said deflecting means discharging said material to one side of said chopper when in one of said positions and discharging the material to the other side of said chopper when in the other of said positions, said deflecting means including an elongate generally vertical portion having inner and outer end portions and adapted to intercept and divert the direction of flow of said material and discharge same from said outer end thereof when in either of said positions, and flanges extending laterally from and longitudinally of both sides of said vertical portion for carrying and supporting the material diverted by said vertical portion, said inner end portion being adapted to swing between the opposite sides of said chopper when moved from one position to the other and being rearwardly spaced from said chopper when in either of said positions, over-center spring means connected to said deflecting means and adapted to move from one side of said axis to the other when said deflecting means moves from one position to the other and bias said deflecting means towards the position to which it is moving, stop means for holding said deflecting means in said position against the action of said spring means, and generally vertically disposed shield means disposed on each side of the discharge mouth of said chopper for confining the flow of material from said mouth therebetween and guiding said material against said vertical portion.

2. A windrowing attachment as defined in claim 1 wherein said stop means includes first and second stop members secured to said supporting structure on opposite sides of said generally vertical axis, and said inner end portion of said deflecting means being located between one of said stop members and said chopper when said deflecting means is in either of said positions.

3. A windrowing attachment for a straw chopper having a discharge mouth comprising supporting structure adapted for mounting on said chopper including generally horizontally disposed top enclosure means for overlying the flow of material issuing from said chopper, material deflecting means suspended from said supporting structure for pivotal movement about a generally vertical axis between first and second operating positions, said deflecting means discharging said material to one side of said chopper when in one of said positions and discharging the material to the other side of said chopper when in the other of said positions, said deflecting means including an elongate generally vertical portion having inner and outer end portions and adapted to intercept and divert the direction of flow of said material and discharge same from said outer end thereof when in either of said positions, and flanges extending laterally from and longitudinally of both sides of said vertical portion for carrying and supporting the material diverted by said vertical portion, said inner end portion being adapted to swing between the opposite sides of said chopper when moved from one position to the other and being rearwardly spaced from said chopper when in either of said positions, means connected to said deflecting means and adapted to move said deflecting means from one of said positions to the other of said positions, stop means for holding said deflecting means in said position against the action of said last recited means, and generally vertically disposed shield means disposed on each side of the discharge mouth of said chopper for confining the flow of material from said mouth therebetween and guiding said material against said vertical portion.

4. A windrowing attachment for a straw chopper comprising supporting structure adapted for mounting on said chopper including generally horizontally disposed top enclosure means for overlying the flow of material issuing from said chopper, material deflecting means suspended from said supporting structure for pivotal movement about a generally vertical axis between first and second operating positions, said deflecting means discharging said material to one side of said chopper when in one of said positions and discharging the material to the other side of said chopper when in the other of said positions, said deflecting means including an elongate generally vertical portion having inner and outer end portions and adapted to intercept and divert the direction of flow of said material and discharge same from said outer end thereof when in either of said positions, and flanges extending laterally from and longitudinaly of both sides of said vertical portion for carrying and supporting the material diverted by said vertical portion, said inner end portion being adapted to swing between the opposite sides of said chopper when moved from one position to the other and being rearwardly spaced from said chopper when in either of said positions, over center spring means connected to said deflecting means and adapted to move from one side of said axis to the other when said deflecting means moves from one position to the other and bias said deflecting means towards the position to which it is moving, and stop means for holding said deflecting means in said position against the action of said spring means.

References Cited in the file of this patent

UNITED STATES PATENTS

| | | |
|---|---|---|
| 2,854,046 | Devorak | Sept. 30, 1958 |
| 2,911,780 | Brady | Nov. 10, 1959 |
| 2,918,776 | Coultas | Dec. 29, 1959 |
| 3,015,927 | Caldwell | Jan. 9, 1962 |
| 3,059,403 | Bamford et al. | Oct. 23, 1962 |